United States Patent
Gozzi et al.

(10) Patent No.: US 12,321,969 B2
(45) Date of Patent: Jun. 3, 2025

(54) SYSTEM AND METHOD FOR TRANSACTION OF GOODS

(71) Applicants: Fabio Gozzi, Sao Paulo (BR); Jose Gozzi, Sao Paulo (BR)

(72) Inventors: Fabio Gozzi, Sao Paulo (BR); Jose Gozzi, Sao Paulo (BR)

(*) Notice: Subject to any disclaimer, the term of this patent is extended or adjusted under 35 U.S.C. 154(b) by 569 days.

(21) Appl. No.: 17/144,658

(22) Filed: Jan. 8, 2021

(65) Prior Publication Data
US 2021/0304262 A1  Sep. 30, 2021

(30) Foreign Application Priority Data
Jan. 10, 2020 (BR) .......................... 1020200006738

(51) Int. Cl.
| | |
|---|---|
| *G06Q 30/02* | (2023.01) |
| *G01C 21/34* | (2006.01) |
| *G06F 16/29* | (2019.01) |
| *G06Q 30/0601* | (2023.01) |
| *G06T 19/00* | (2011.01) |

(52) U.S. Cl.
CPC ..... *G06Q 30/0281* (2013.01); *G01C 21/3407* (2013.01); *G06F 16/29* (2019.01); *G06Q 30/0643* (2013.01); *G06T 19/006* (2013.01)

(58) Field of Classification Search
CPC .......... G06Q 30/0281; G06Q 30/0643; G01C 21/3407; G06F 16/29; G06T 19/006
See application file for complete search history.

(56) References Cited

U.S. PATENT DOCUMENTS

| | | | | |
|---|---|---|---|---|
| 11,201,981 | B1* | 12/2021 | Suiter | G06Q 30/0639 |
| 11,676,225 | B1* | 6/2023 | Catalano | G06Q 50/16 |
| | | | | 705/313 |
| 2013/0253832 | A1* | 9/2013 | Nallu | G06Q 30/0639 |
| | | | | 701/538 |
| 2020/0302510 | A1* | 9/2020 | Chachek | G06V 20/52 |

OTHER PUBLICATIONS

Sihi, Home sweet virtual home: The use of virtual and augmented reality technologies in high involvement purchase decisions, Journal of Research in Interactive Marketing, Nov. 13, 2018; 12(4):398-417 (Year: 2018).*

* cited by examiner

*Primary Examiner* — Resha Desai
*Assistant Examiner* — Patrick Kim
(74) *Attorney, Agent, or Firm* — Lippes Mathias LLP

(57) ABSTRACT

A system and method of transaction of goods, configured by a digital platform (10) including at least one secondary platform (12), the secondary platform(s) (12) being configured to interact with one another, wherein each secondary platform is configured with a specific function that may be related to the transaction of goods so that the system may be configured with a set of functions through each secondary platform, wherein at least one secondary platform is configured as an interactive map (12A), an augmented reality tool (12B), an intermediate tool (12C) or a search tool (12D). Also disclosed are a mobile device (10), a digital platform (11) and a mobile device-readable medium (10) compatible with the system and method of transaction of goods.

2 Claims, 4 Drawing Sheets

SYSTEM AND METHOD FOR TRANSACTION OF GOODS

The present invention relates to a system and method of purchasing goods integrated with a plurality of functionalities, including a selective real-time presentation of the goods for sale to at least one user as he walks through a certain location.

The present invention also relates to a digital platform compatible with the system and method for transaction of goods also object of the present invention.

DESCRIPTION OF THE PRIOR ART

A number of systems and methods for the transaction of goods (such as buying, selling, exchanging, etc.) are known to exist. Such solutions are known to simply display to the user data about the goods offered, for example, in a list.

These solutions are very simplified and do not have substantial characteristics that would allow a user to have an adequate and satisfactory experience when searching for goods of interest. It can be especially perceived when such goods are found in large areas, as a potential buyer must go to it, often traveling long distances, hence wasting a lot of time.

Moreover, since the distance traveled can be quite long and the region or location is large or even unknown, the search for the good of interest can be severely impaired.

Some examples of these cases may include searching for houses in a specific city or region, car shows (fairs) and other goods.

In these cases, the search experience can be quite impaired because the platforms known in the prior art are not suitable for this purpose, especially in this context of searching large regions.

Specifically in the case of real estate, transaction platforms of this kind are known to be mainly configured for use by construction companies, real estate companies and specific companies that can mediate these transactions. As a rule, such companies retain the information on the properties available and allow access to said information only selectively.

Therefore, there is no solution in the prior art that facilitates access to information on available goods, nor the search for specific goods in large areas or regions.

The prior art also fails to provide solutions that, for example, provide an integration of a plurality of platforms, including for example, transaction platforms, an interactive map for the selective presentation of goods offered in real time as a user walks through a certain location, legal advice platform, artificial intelligence, among others.

OBJECTS OF THE INVENTION

An object of the present invention is to provide a goods transaction system provided with tools to optimize the search for such goods, particularly in large areas.

An object of the present invention is to provide a goods transaction system comprising a digital platform, wherein the digital platform comprises secondary platforms such as an interactive map, an augmented reality tool, an intermediate tool or a search tool.

An object of the present invention is to provide a goods transaction method implemented through tools that optimize the search for such goods, in particular in large areas.

An object of the present invention is to provide a goods transaction method that comprises the steps of receiving data (information) from secondary platforms such as an interactive map, an augmented reality tool, an intermediate tool or a search tool and selectively displaying at least one information to a user due to at least one of the digital platforms.

An object of the present invention is to provide a digital platform.

An object of the present invention is to provide a mobile device configured to be compatible with the system and method of transaction of goods and with the digital platform also objects of the present invention, wherein said mobile device is configured to optimize the search for goods, particularly in large areas, together with said system, method and digital platform.

An object of the present invention is to provide a computer-readable medium configured to be compatible with the system and method of transaction of goods and with the digital platform and mobile device which are also objects of the present invention.

BRIEF DESCRIPTION OF THE INVENTION

The objectives of the present invention are achieved through a system for transaction of goods comprising at least one mobile device, a central data processing system and a digital platform.

The objectives of the present invention are achieved through a method of transaction of goods configured to receive data from a user, selectively enabling a transaction of goods and allowing access to at least one digital platform.

The objectives of the present invention are achieved through a digital platform that comprises at least one secondary platform, the secondary platforms being configured to interact with each other, wherein each secondary platform can be configured with a specific function that may be related to the transaction of goods, the digital platform being compatible with the system and method of the present invention.

The objectives of the present invention are achieved by means of a mobile device configured to be compatible with the system, method and digital platform objects of the present invention.

The objectives of the present invention are achieved by means of a computer-readable medium configured as a medium that can be read by the mobile device object of the present invention and being compatible with the system, method and digital platform also objects of the present invention.

BRIEF DESCRIPTION OF THE DRAWINGS

The present invention will now be described in more detail based on one embodiment shown in the drawings. The figures show.

DETAILED DESCRIPTION OF THE FIGURES

First of all, and referring to FIGS. 1 to 4, the present invention relates to an advantageous system and method for the transaction of goods, which can be any goods, in particular real estate ones such as houses, apartments, buildings, lands and the like.

Real estate stands out in particular because it is known that the search for this type of property is too laborious and sometimes carried out at the desired location (city, neighborhood, region, avenue, street, condominium, building and the like). Thus, certain paths and distances have to be traveled in this search, so that the present solution aims to optimize this task.

Similarly, the present invention applies advantageously to other goods and various products which are exemplified in a non-exhausting manner: objects in general, vehicles, stock products, consumer goods, food, beverages, furniture, household products, products stored in warehouses of the most diverse natures, among many others that need to be easily located and identified in large areas.

By transaction is meant the process of buying, selling, leasing, pledging, exchanging, searching, providing, receiving, withdrawing or the like related to the good in question.

Also, the present invention can be successfully implemented by means of a mobile device 10 which, in one configuration, can be understood as a smartphone device. Such a mobile device 10 is compatible with the teachings of the present invention and is therefore capable of operating through specific means and functionalities and can be understood as a means to read certain instructions and implement the techniques proposed herein. However, similar devices can also be used without prejudicing the proposed objectives, such as tablets, laptops (notebooks) or other similar portable equipment.

In order for the objectives of the present invention to be achieved with maximum efficiency, such equipment must be provided with image capture devices C such as cameras, for example, which will allow all functionalities of the present proposal to be successfully supplied.

After these initial considerations, the technical features of the proposed invention will be detailed below.

Specifically concerning the goods transaction system of the present invention, it comprises at least one mobile device 10, a central data processing system and a digital platform 11 connected together digitally or electronically, for example. Obviously, other additional components can eventually comprise said system, such as Bluetooth, infrared connection means, QR Code, NFC, and so on.

Figure 1:
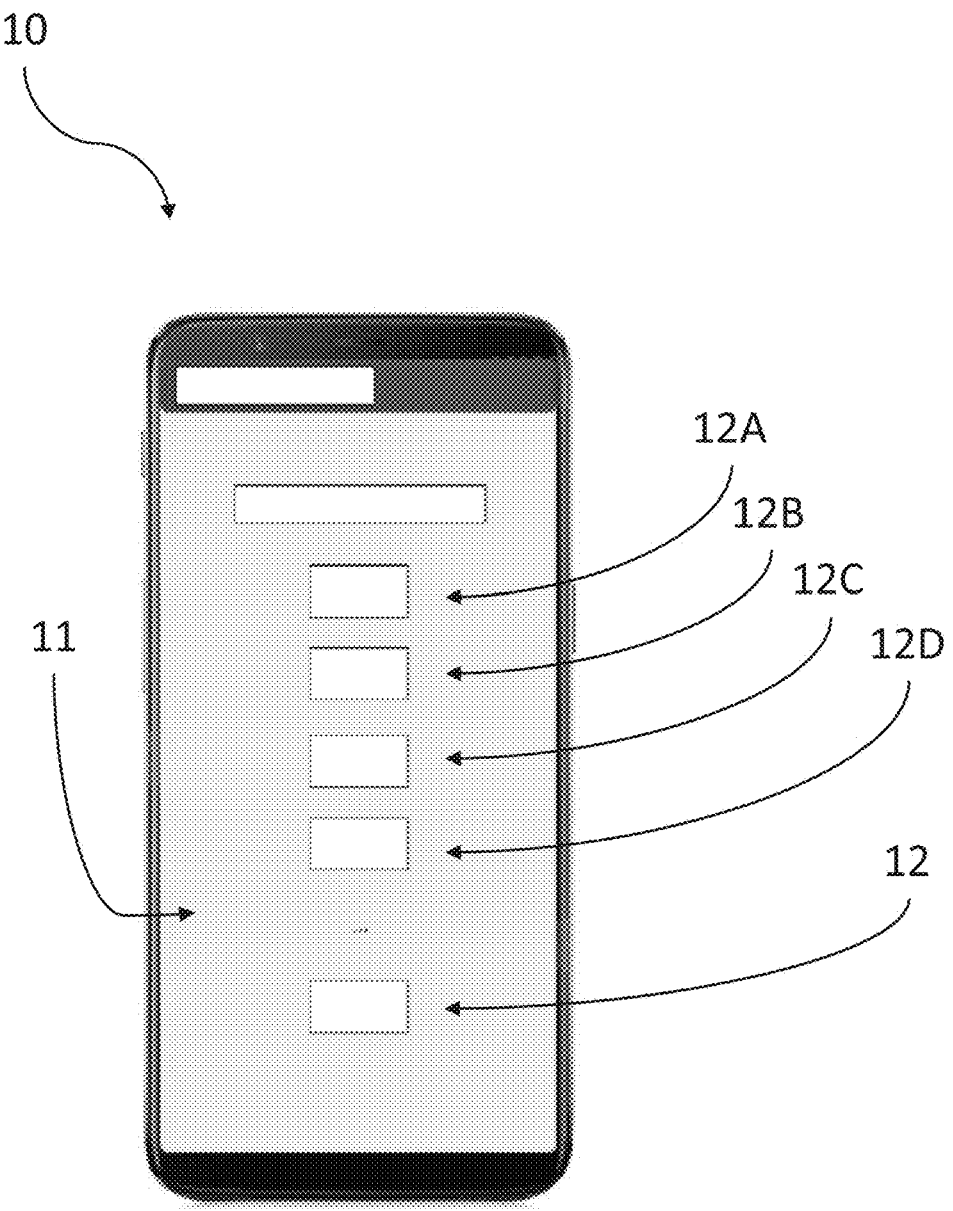
FIG. 1—is an example of a mobile device and a digital platform configured in accordance with the teachings of the present invention.

As shown in particular in FIG. 1, the digital platform 11 can be configured as a platform compatible with said mobile device 10 and further include at least one secondary platform 12, which can be, for example, a financial, real estate, legal, search, messaging, video and audio capture, location platform, or any other application and functionality, such as artificial intelligence, document generation and so on. In one configuration, the digital platform 11 can be understood as being such as an application that can be implemented on a mobile device 10 and read thereby so that, in operation, it performs and implements the features, steps and functionalities described herein.

In any case, secondary platforms 12 can be configured to interact with each other, wherein each secondary platform 12 is configured with a specific function that can be related to the transaction of goods so that the system can be configured with a set of functions through each secondary platform.

In one configuration, the secondary platforms 12 can be selected from the group formed by at least one of an interactive map 12A, an augmented reality tool 12B, an intermediate tool 12C and/or a search tool 12D.

In this regard, the interactive map 12A is configured to perform a selective presentation of the goods offered in real time as the user travels across a certain location, the interactive map 12A can also present the location of at least one user in real time.

In other words, in the context of the present invention, said interactive map 12A is configured so that as the user moves (walks) across a certain location (neighborhood, street, avenue, city, condominium and the like), the interactive map 12A itself automatically presents information related to the goods that are available around him/her. Such information may include, for example, an indication that the good is actually available, condition of the good, price, payment conditions, additional information, specifications and the like. The nature of such information should not be understood, however, as limitations of the present invention so that any information can be presented to the user without changing the major advantages provided by the present proposal.

Moreover, information may be presented depending on the nature of that good such as brand, model, color, size and the like, for example. These features apply if the good in question is, for example, a vehicle or the like displayed in an automobile fair or large store, for example.

Anyway, in one configuration of the present invention, the interactive map 12A is configured so that information about the goods for sale is displayed in real time on the mobile device 10 as the user moves across a certain location, that is, when the user approaches a certain good available for transaction, information thereon will be displayed.

To this end, the good must be located within a certain range of the user, so that when the good is no longer within this range, information will no longer be displayed. This means that the user can be understood as the center (central point) of a given region in which the available goods must be located so that they can be selectively displayed on the mobile device 10 in real time as this user moves. If the goods are not within this region, information thereon will not be displayed.

Thus, in one configuration, the interactive map 12A is configured based on geolocation, so that a user's location is determined and updated in real time, with information on the goods being selectively displayed according to said location.

The techniques that allow geolocation to be implemented can include, for example, satellites and general triangulation, Wi-Fi, radio frequency, GPS and the like, as long as they are properly applicable to the present invention.

In addition, the interactive map 12A is also configured to allow driving routes to be recorded (saved) between at least two spots defined therein. Thus, it is possible to save a route that guides the user to a specific good so that, advantageously, one can get there posteriorly.

Figure 3:
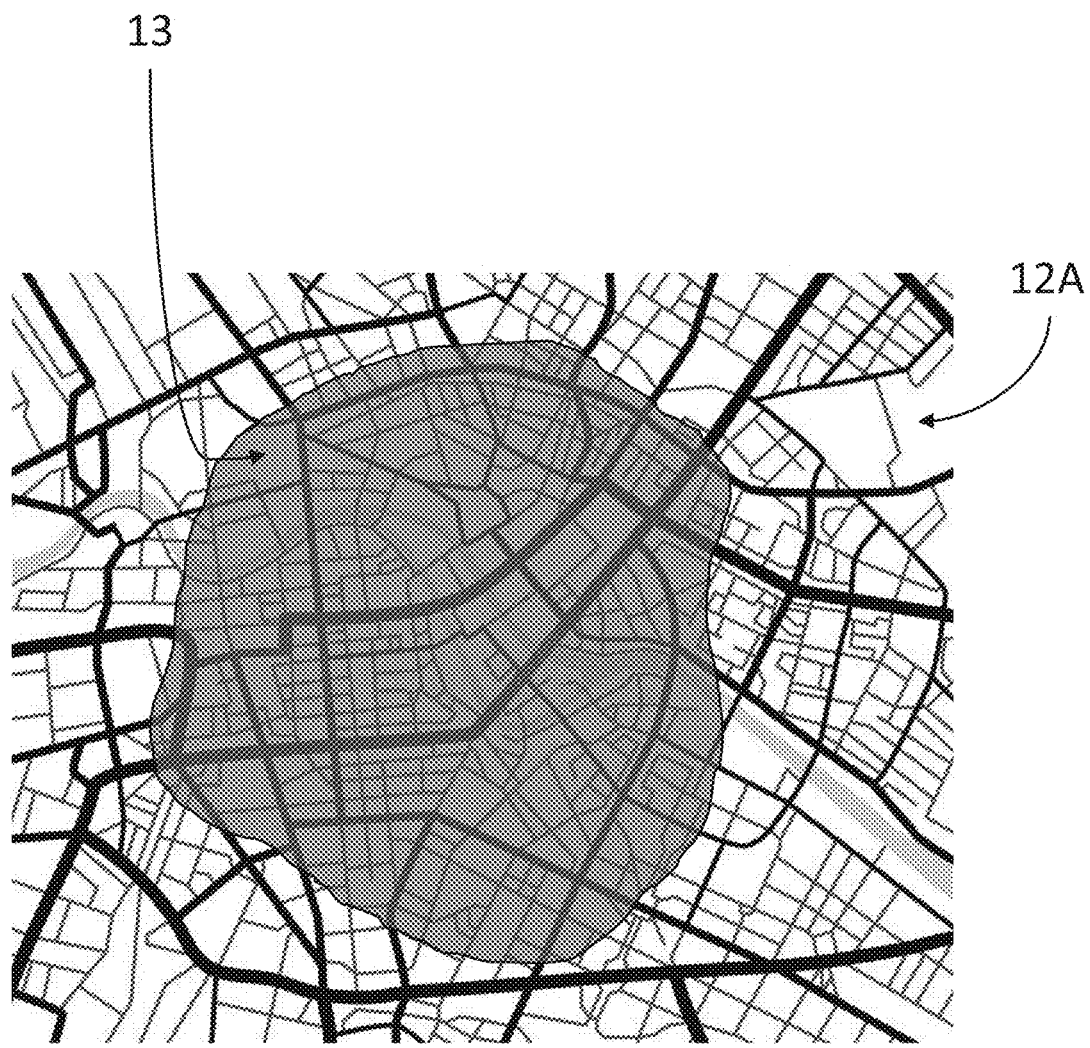
FIG. 3—is an example of a secondary platform configured as an interactive map, highlighting the selection of a specific area in accordance with the teachings of the present invention.

The interactive map 12A is also configured to allow one to select a specific area 13 in said map, as shown in FIG. 3. In other words, the user can select a specific region of interest in the interactive map 12A and thus have access to information on that specific region.

Such a selection can be made in several ways, especially depending on the type of mobile device 10, but in general the selection by touch (touchscreen) is found viable in the present invention. Such a selection can be made through random, linear or non-linear segments, including the selection through the mobile device 10 itself.

In one configuration, predetermined shapes (rectangular, circular, triangular and the like) can also be implemented.

The user can also selectively move the interactive map 12A to check goods at locations other than the one where he/she is.

Figure 4:
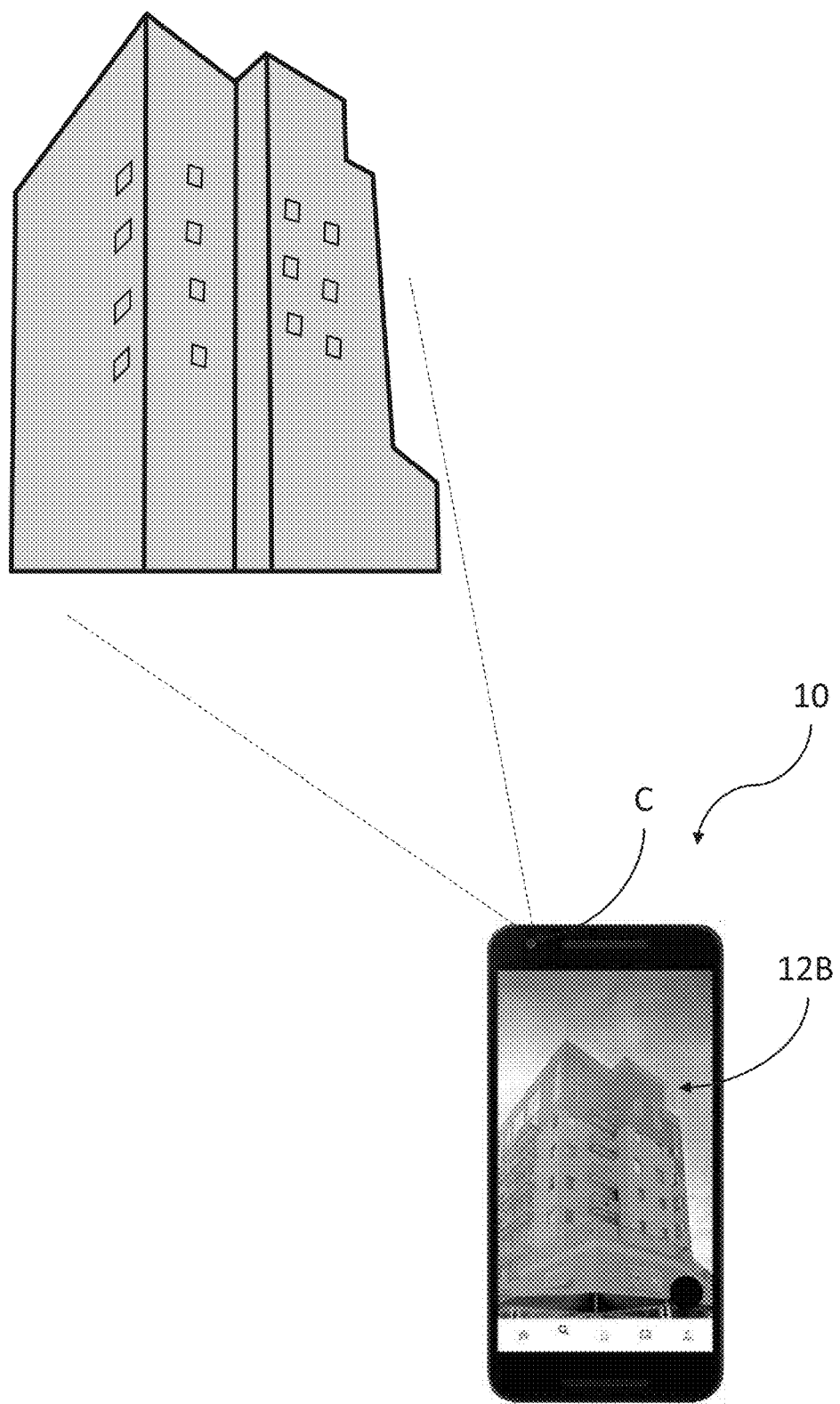
FIG. 4—is an example of an augmented reality tool in use in accordance with the teachings of the present invention.

In one configuration, at least one secondary platform is configured, such as an augmented reality tool 12B. This tool acts directly in conjunction with an image capture component C (such as a camera) of the mobile device 10, which allows the augmented reality tool 12B to be configured so that images of the good are displayed on the mobile device 10. FIG. 4 illustrates this tool in use.

In one configuration, the user must point the mobile device 10 to the available good so that information about that specific good is displayed.

Figure 2:
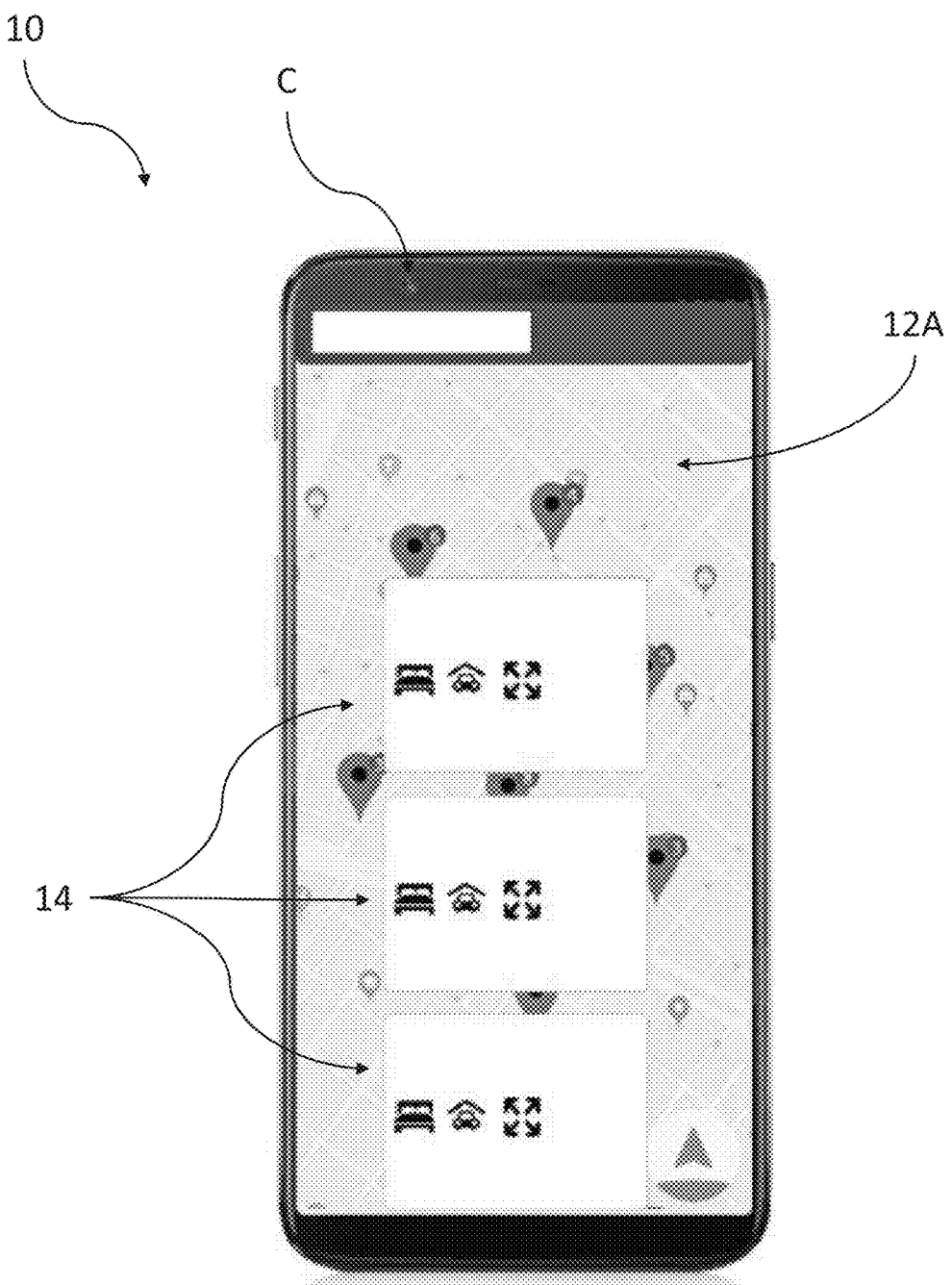
FIG. 2—is an example of a digital platform and secondary platforms in accordance with the teachings of the present invention.

In the case where more than one good is available in the same location (such as more than one apartment in the same building, for example), lists with information on the goods 14 available can also be displayed for the user to select those of interest. FIG. 2 in particular highlights this advantageous feature.

Through the augmented reality tool 12B, the user will be able to view specific details of that good. Specifically in relation to real estate, this tool is quite advantageous since many places (mainly buildings) do not allow hanging on its exterior banners with information on the sale or lease. Therefore, the present solution advantageously allows one to obtain information on a particular property available, in particular, real estate, while respecting the norms of that specific location, without visually polluting the environment nor violating laws.

This feature is implemented considering the user's location as well as the location of the good. When these locations are the same and the user is pointing his/her mobile device 10 at that good, the system is configured to display information on it on the mobile device 10 itself.

In other words, data on the location of the good, the user's location and direction of the mobile device 10 are compared and, if a match is found, information is displayed accordingly. This presentation may be, in one configuration, in the form of a list.

Thus, through the image capture component C of the mobile device 10, it is still possible to search for available goods by simply directing (pointing) the image capture component C to the location of the good of interest so that it can be identified by the invention proposed herein.

For real estate it is exemplified that the augmented reality tool 12B may even allow one to simulate the arrangement of objects in its interior, wall colors, objects in general, furniture, etc. For automobiles for example, different colors of paint and components such as wheels, seats, steering wheels, airfoil, hood and the like can be simulated using augmented reality.

Regardless of the nature of the good in question, the present invention allows one to verify in real time attributes, several possible configurations and characteristics related thereto, the user being at least close to the good's location.

In one configuration, at least one secondary platform is configured as an intermediate tool 12C between at least two users in said transaction, the users being able to contact each other using such intermediate tool 12C.

In other words, the intermediate tool 12O, when implemented, can be understood as a conversation (chat) platform between the parties, whether by text, audio or video. This tool can be used, for example, to schedule visits at a specific location.

In the case of visits, for example, to a real estate property, the system is configured to show the user that a visit is taking place at that location. It is made by crossing location data of users and that specific good. During this visit, some tools may be selectively disabled. Such visits can obviously be scheduled and canceled, if required.

In one embodiment, at least one secondary platform is configured as a search tool 12D, wherein a search can be performed based on at least one search filter. This filter can include at least one keyword, image, users and/or a specific area 13 of the interactive map 12A.

For this tool, the filter must be inserted by the user, allowing him/her to have access to specific information on the features of interest, for example, characteristics, locations, conditions and specific criteria in general.

To this end, the search tool 12D is configured to scan the registered goods and selectively present selected goods to the user based on at least one filter included by him/her.

In general, it should be noted that other secondary tools can be implemented in the present invention.

In one configuration, the proposed system allows the user to have a registered user profile and access a home page (feed) that automatically displays a plurality of information and goods (without the need for searches), according to that user's profile and habits.

In his/her profile, the user will have access to useful tools such as favorites, personal data, search and visit history, FAQ, routes, likes, saved photos, saved profiles, forgot my password, notifications, general settings, chat, help and so on.

A secondary tool that may be a part of the proposed invention comprises a panic trigger. In one configuration, this trigger is configured as a button that can be actuated at any time by the user, especially when a visit is scheduled with another user.

If one of the users is in danger or feels threatened, he/she can press this button. Upon actuation and confirmation by the user who triggered the button that there is indeed a threat, this user will automatically receive guidance through the system itself, instructing him/her on how to proceed.

An automatic call may be made and, for example, a specific instruction for replying given to validate the need for security measures.

Finally, the proposed system may be configured to selectively enable the transaction of a good, allowing the parties to complete the transaction now enabled by said system. To this end, the system may be integrated with financial and banking platforms that allow the transaction to be completed.

If one do not wishes to use the present invention to carry out the transaction as discussed above, it can be perfectly applied for disclosure purposes only, so that the available good is located and identified by the present proposal as previously detailed, without necessarily enabling its respective transaction.

Regarding the disclosure of such good, it should be noted that it must be in line with the legal conditions of each location. Anyway, in one configuration of the present invention, said disclosure can be made in an external environment (visible from an external environment relative to the property in question, such as on the street) or internally (in corridors, inside of warehouses, on floors and halls of a specific location and the like). Thus, the present invention can be advantageously applied to both configurations of disclosure.

For the disclosure in particular, in one configuration of the present invention there is also provided that the available goods can be automatically disclosed when the user is close to the location where said good is found. In other words, when the user is close to a place where the sale of a certain good takes place, the user may receive, for example, through notifications on the mobile device 10 that that site has a certain good available. This disclosure may include, for example, prices, quantities, models, types, characteristics and useful information in general about that good.

In addition to the above, the present invention also relates to a method of transaction of goods compatible with the goods transaction system also object of the present invention. Thus, except for certain adaptations, the features of the already described for the proposed system also apply to the present method.

In general, the proposed method is configured to be implemented by at least one mobile device 10, a central data processing system and a digital platform 11 connected to each other.

Regarding the method itself, it comprises a series of steps, which will be detailed below.

One step of the proposed method comprises allowing access to at least one digital platform 11 by at least one user. This step is required so that the tools of the present invention are tangible to said user. Such step can be implemented, for example, through an installation (download) on the mobile device 10, a registration on the platform, validation such as token, SMS or the like.

One step of the proposed method comprises receiving data from the user through at least one secondary platform 12, wherein the secondary platforms can be configured as at least one among an interactive map 12A, an augmented reality tool 12B, an intermediate tool 12C and/or a search tool 12D.

Having previously described the characteristics of the secondary platforms 12, they will not be replicated herein, but in any case, the characteristics of the already detailed system apply similarly to the present method.

The step of receiving data from the user can be understood as a step of specifically using at least one of the secondary tools 12, through which said user can make a request (search, displacement, selection on the interactive map, crossing of data, etc.) to obtain a response with the requested information.

Thus, one step of the proposed method is to selectively display at least one information on the mobile device 10 depending on at least one secondary platform 12 in use.

In addition to the above, the secondary platforms 12 may be configured to interact with one another, wherein each secondary platform 12 is configured with a specific function that can be related to the transaction of goods so that the method can be implemented with a set of functions via each secondary platform 12. Since these platforms have already been described in detail above, for the sake of simplification they will only be listed below in reference to the proposed method.

Regarding the secondary platforms 12 at least one secondary platform can be configured as an interactive map 12A, so that the method is further configured with a real time step of: as the user moves across a specific location, the interactive map 12A can also display the location of at least one user also in real time.

The interactive map 12A can be configured based on geolocation, so that the method is configured to perform a step of determining and updating a user's location in real time and selectively displaying information on the goods depending on that location.

At least one secondary platform 12 can be configured as a configured augmented reality tool 12B, so that the method is further configured with a step of displaying images of the goods on the mobile device 10.

At least one secondary platform 12 can be configured as an intermediate tool 12C between at least two users in said transaction, so that the method is further configured with a step of allowing users to contact each other through such an intermediate tool 12C.

At least one secondary platform 12 can be configured as a search tool 12D, wherein the method is configured to allow a search to be performed based on at least one filter from at least one keyword, image and/or one specific area 13 in the interactive map 12A.

The proposed method may further comprise an additional step of allowing driving routes between at least two spots defined in said interactive map to be recorded (saved).

The proposed method may further comprise an additional step of allowing a specific area 13 on said map to be selected, as shown in FIG. 3, wherein such selection can be made by means of random, linear or non-linear segments, including the selection by touching the mobile device 10 (touch screen).

The proposed method may further comprise an additional step of displaying images of at least one good on the mobile device 10 at least when the mobile device 10 is pointed at a specific location of the good, such pointing may be done through an image capture device C coupled to the mobile device 10.

The proposed method can further comprise an additional step of scanning registered goods and selectively presenting such selected goods using at least one search filter.

The proposed method may further comprise an additional step of selectively enabling the transaction of a good.

Finally, the present invention also relates to a digital platform 11 comprising at least one secondary platform 12 and being compatible with the system and method of transaction of goods described above. Thus, the already described features also apply to said digital platform 11 itself, which can be even understood as a super platform ("super app") as it encompasses in its structure other secondary ("smaller") platforms 12.

The present invention further comprises a mobile device-readable medium 10. Such medium can be understood as a CD, a pen-drive or any other device that can be read electronically, as already detailed above. Such medium is therefore compatible with the features described herein and, in one configuration, it comprises these steps, characteristics and achieves the advantages detailed herein.

Having described a preferred embodiment of the present invention, it should be understood that the scope of the present invention encompasses other possible variations, being limited only by the content of the appended claims, including any possible equivalents thereof.

The invention claimed is:

1. A goods transaction system comprising
at least one mobile device (10), wherein the mobile device (10) is a smartphone and comprises:
a processor, and
an image capture component (C); and
a digital platform (11), comprising an application executed by the processor,
wherein the digital platform (11) is configured to enable a transaction of at least one good, said at least one good being a real estate, and is integrated with at least one financial and banking platform,
wherein the digital platform (11) comprises secondary platforms (12), the secondary platforms (12) being configured to interact with each other, and wherein each secondary platform of the secondary platforms (12) is configured with a specific function related to the transaction of said at least one good, wherein:

at least a first secondary platform of the secondary platforms (12) is configured as an interactive map (12A) and presents, in real-time, information about the at least one good as a user travels across a location, wherein the geolocation of the user is set as the center of the interactive map (12A), the interactive map (12A) further presenting driving routes between at least two locations that can be saved, and is configured to allow the user to select, through the mobile device (10), a specific area (13) on the interactive map (12A) through random, linear or non-linear segments, at least a second secondary platform of the secondary platforms (12) is configured as an augmented reality tool (12B) and is configured to:

communicate with the image capture device (C) of the mobile device (10), display an image, captured by the image capture device (C), of the at least one good on the display of the mobile device (10) as the mobile device (10) is pointed in a direction at the at least one good, comparing the location of the at least one good, the geolocation of the user, and the direction of the mobile device (10), in response to the location of the at least one good, the geolocation of the user and the direction of the mobile device matching, displaying information about the at least one good on the mobile device (10), and simulating objects in the interior of the at least one good by using augmented reality, at least a third secondary platform of the secondary platforms (12) is configured as an intermediate tool (12C), wherein the intermediate tool (12C) allows communication between the user and one or more other users participating in said transaction, the communication including text, audio, or video, at least a fourth secondary platform of the secondary platforms (12) is configured as a search tool (12D) and is configured to:

search a database of registered goods based on at least one search filter provided by the user, the search filter including at least one keyword, search image, and/or the specific area (13) of the interactive map (12A), and display goods from the database of registered goods that match at least one search filter.

2. The goods transaction system of claim 1, further comprising a fifth secondary platform of the secondary platforms configured to include:

a panic trigger for receiving guidance on how to proceed in an emergency during a transaction of the good.

* * * * *